(12) United States Patent
Arni et al.

(10) Patent No.: US 8,386,282 B2
(45) Date of Patent: Feb. 26, 2013

(54) MANAGING EVENTS IN A CONFIGURATION OF SOA GOVERNANCE COMPONENTS (75) Inventors: Majeed M. Arni, Austin, TX (US); Peter A. Coldicott, Leander, TX (US); Eduardo T. Kahan, Longwood, FL (US); Mei Y. Selvage, Pocatello, ID (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 12/507,205

(22) Filed: Jul. 22, 2009

(65) Prior Publication Data

US 2011/0022439 A1  Jan. 27, 2011

(51) Int. Cl.
*G06Q 40/00* (2012.01)
(52) U.S. Cl. ...................... 705/7.11; 705/7.42
(58) Field of Classification Search ............. 705/9, 7.11, 705/7.42
See application file for complete search history.

(56) References Cited

U.S. PATENT DOCUMENTS

| | | | | |
|---|---|---|---|---|
| 5,274,547 A * | 12/1993 | Zoffel et al. | | 705/38 |
| 5,708,422 A * | 1/1998 | Blonder et al. | | 340/5.41 |
| 6,064,988 A * | 5/2000 | Thomas | | 705/44 |
| 6,311,169 B2 | 10/2001 | Duhon | | |
| 7,000,219 B2 * | 2/2006 | Barrett et al. | | 717/107 |
| 7,035,877 B2 | 4/2006 | Markham et al. | | |
| 7,058,861 B1 | 6/2006 | Adams | | |
| 7,065,566 B2 | 6/2006 | Menard et al. | | |
| 7,313,533 B2 * | 12/2007 | Chang et al. | | 705/7.38 |
| 7,313,568 B2 | 12/2007 | Cutlip et al. | | |
| 7,421,702 B1 * | 9/2008 | Margulis et al. | | 719/316 |
| 7,467,109 B1 * | 12/2008 | Simon et al. | | 705/36 R |
| 7,509,308 B2 | 3/2009 | Huang et al. | | |
| 7,584,146 B1 * | 9/2009 | Duhon | | 705/38 |
| 7,680,728 B2 * | 3/2010 | Lazerson | | 705/38 |
| 7,765,557 B2 | 7/2010 | Young | | |
| 7,937,716 B2 | 5/2011 | Betts et al. | | |
| 7,962,574 B2 * | 6/2011 | Bauchot et al. | | 709/218 |
| 8,005,709 B2 | 8/2011 | King et al. | | |
| 8,019,632 B2 * | 9/2011 | Niheu et al. | | 705/7.11 |
| 8,037,122 B2 * | 10/2011 | Saha et al. | | 709/201 |

(Continued)

OTHER PUBLICATIONS

Berry, "Algorithm for Detecting Significant Changes in Performance Metric Values", Jul. 1, 1995, IBM Technical Disclosure Bulletin vol. 38, No. 7, pp. 493-494.

(Continued)

*Primary Examiner* — Thomas Dixon
*Assistant Examiner* — Benjamin S Fields
(74) *Attorney, Agent, or Firm* — Yee & Associates, P.C.; Arthur J. Samodovitz (57) ABSTRACT

Embodiments of the invention are associated with a configuration comprising multiple integrated SOA governance components, and are generally concerned with monitoring and managing events that can or are likely to impact on different components of the configuration. One embodiment of the invention, directed to a method, comprises the steps of detecting a particular event that occurs at a particular SOA governance component of the configuration, and routing information pertaining to the detected event to a pre-specified storage location. The method further comprises operating a monitoring mechanism to selectively monitor the information routed to the location, and to determine from the monitored information that the particular event has occurred at the particular component of the configuration. Responsive to determining that the particular event has occurred at the particular component, the monitoring mechanism is further operated to query each of the remaining SOA governance components, in order to identify each of the remaining components in which the particular event does not exist.

19 Claims, 6 Drawing Sheets

U.S. PATENT DOCUMENTS

| | | | |
|---|---|---|---|
| 8,122,426 B2 | 2/2012 | Isom | |
| 8,140,615 B2* | 3/2012 | Miller et al. | 709/202 |
| 2001/0011245 A1* | 8/2001 | Duhon | 705/38 |
| 2002/0173997 A1 | 11/2002 | Menard et al. | |
| 2003/0009418 A1* | 1/2003 | Green et al. | 705/38 |
| 2003/0115078 A1 | 6/2003 | Young | |
| 2003/0158795 A1 | 8/2003 | Markham et al. | |
| 2004/0060038 A1 | 3/2004 | Johnston-Watt et al. | |
| 2004/0177335 A1* | 9/2004 | Beisiegel et al. | 717/102 |
| 2004/0193703 A1* | 9/2004 | Loewy et al. | 709/220 |
| 2005/0043976 A1 | 2/2005 | Leehman | |
| 2005/0165797 A1* | 7/2005 | Nair | 707/100 |
| 2006/0224425 A1 | 10/2006 | Homann et al. | |
| 2006/0235733 A1* | 10/2006 | Marks | 705/7 |
| 2006/0247991 A1* | 11/2006 | Jin et al. | 705/35 |
| 2007/0033139 A1* | 2/2007 | Handler | 705/44 |
| 2008/0069082 A1* | 3/2008 | Patrick | 370/351 |
| 2008/0069124 A1* | 3/2008 | Patrick | 370/401 |
| 2008/0163166 A1* | 7/2008 | Raman | 717/107 |
| 2008/0270153 A1* | 10/2008 | Drapkin et al. | 705/1 |
| 2008/0300950 A1 | 12/2008 | Bhaskaran et al. | |
| 2009/0064087 A1* | 3/2009 | Isom | 717/101 |
| 2009/0064192 A1 | 3/2009 | Betts et al. | |
| 2009/0112644 A1* | 4/2009 | Isom | 705/7 |
| 2009/0144748 A1 | 6/2009 | Foody | |
| 2010/0077068 A1* | 3/2010 | Saha et al. | 709/223 |
| 2010/0131326 A1* | 5/2010 | Channabasavaiah et al. | 705/9 |
| 2010/0192004 A1* | 7/2010 | Bauchot et al. | 714/2 |
| 2010/0217632 A1* | 8/2010 | Channabasavaiah et al. | 705/7 |
| 2010/0228587 A1* | 9/2010 | Channabasavaiah et al. | 705/8 |
| 2010/0250295 A1* | 9/2010 | Channabasavaiah et al. | 705/7 |
| 2010/0250298 A1* | 9/2010 | Channabasavaiah et al. | 705/7 |
| 2010/0250299 A1* | 9/2010 | Channabasavaiah et al. | 705/7 |
| 2010/0250316 A1* | 9/2010 | Channabasavaiah et al. | 705/8 |
| 2010/0250320 A1* | 9/2010 | Channabasavaiah et al. | 705/9 |
| 2010/0257010 A1* | 10/2010 | Allam et al. | 705/8 |
| 2010/0280856 A1* | 11/2010 | Channabasavaiah et al. | 705/7 |
| 2011/0010217 A1 | 1/2011 | Arni et al. | |
| 2011/0071946 A1* | 3/2011 | Handler | 705/44 |
| 2011/0082721 A1 | 4/2011 | Arni et al. | |
| 2011/0099558 A1* | 4/2011 | Patrick et al. | 719/315 |
| 2011/0320238 A1* | 12/2011 | Niheu et al. | 705/7.24 |

OTHER PUBLICATIONS

Bhattacharya et al., "Enabling Analysts in Managed Services for CRM Analytics", 2009, KDD'09, Jun. 28 Paris France, pp. 1077-1085.

U.S. Appl. No. 12/502,010, filed Jul. 13, 2009, Arni et al.

Kenney et al., Magic Quadrant for Integrated SOA Governance Technology Sets 2007, Gartner Research, Dec. 31, 2007, pp. 1-18.

Keen et al., "Implementing Technology to Support SOA Governance and Management", ibm.com/redbooks, pp. 1-354, retrieved Mar. 3, 2009 www.redbooks.ibm.com/abstracts/sg247538.html?Open.

Blechar, Michael T., IBM's Federated Metadata Management Strategy, Gartner Research, Apr. 16, 2007.

U.S. Appl. No. 12/572,475, filed Oct. 2, 2009, Arni et al.

USPTO Office Action dated Sep. 28, 2011, regarding U.S. Appl. No. 12/502,010, 29 pages.

USPTO Office Action dated Oct. 18, 2011, regarding U.S. Appl. No. 12/502,010, 30 pages.

USPTO Office Action dated Dec. 9, 2011, regarding U.S. Appl. No. 12/572,475, 14 pages.

"IBM Tivoli—Common Event Infrastructure," IBM Corporation, http://www-306.ibm.com/software/tivoli/features/cei/, accessed May 16, 2012, 2 pages.

"Performance Indicator," Wikipedia, http://en.wikipedia.org/wiki/Key_performance_indicator, accessed May 16, 2012, 5 pages.

Final Office Action, dated Apr. 9, 2012, regarding U.S. Appl. No. 12/502,010, 23 pages.

* cited by examiner

MANAGING EVENTS IN A CONFIGURATION OF SOA GOVERNANCE COMPONENTS

The present Application is related to the following co-pending applications: U.S. Patent Application Publication 2011/0010217, published on Jan. 13, 2011 to Arni et al., entitled "SERVICE ORIENTED ARCHITECTURE GOVERNANCE USING A TEMPLATE; and U.S. Patent Application Publication 2011/0082721, published on Apr. 7, 2011 to Arni et al., entitled "AUTOMATED REACTIVE BUSINESS PROCESSES", all assigned to the present assignee, and all incorporated herein by reference.

BACKGROUND

1. Field

The invention disclosed and claimed herein relates generally to a method associated with the governance for a service oriented architecture (SOA), and more specifically relates to generating, monitoring and managing events that affect respective components of a configuration of SOA governance components or products.

2. Description of the Related Art

As is known by those of skill in the art, SOA is generally directed to the development of systems that typically group functionality around multiple business processes or the like, in order to provide configurations of interoperable services. SOA infrastructure enables different applications to exchange data with one another, where the applications can pertain to different processes, and respective functions of the SOA are separated into distinct units or services. Various developers and vendors make a number of different services available over a network. Users are thus enabled to access a variety of services, and to combine them together in coordinated relationships. Examples of services associated with SOAs include very practical activities, such as online ordering of airline tickets and hotel reservations.

SOA governance pertains to a set of tasks, processes, or activities that are put in place to exercise control over the respective services of an SOA. A stream of such SOA tasks or processes can be referred to as governance flow. Generally, the focus of governance is to deploy and use the SOA to achieve goals and objectives of a particular business entity or other SOA user. However, different users will typically have different business requirements, growing out of factors such as their individual IT challenges, existing technologies, and users in corporate cultures. They will also have different SOA requirements, such as SOA maturity, entry points, and life cycle.

The SOA governance technology market at present includes a wide variety of products that are targeted toward different users. The various types of SOA governance products are needed, in order to address different communities of users and to satisfy requirements in different stages of SOA life cycle and governance. Examples of such products or components include, without limitation, run-time service registries and repositories that manage service systems of record; development-time asset management systems; and information systems that keep track of infrastructure configuration items, applications and service configurations. Products or components such as these address different aspects of service life cycle and SOA governance.

The governance or governance flow for an SOA generally comprises a configuration of multiple SOA governance components, such as those referred to above, which are integrated or interconnected in a particular way. However, these SOA components are typically capable only of limited tool specific and point-to-point integration with other SOA governance solutions or components. As a result, when an organization needs to add a new or additional SOA governance product, the user of the SOA can be faced with a tedious and complex task. Typically, such new product will have to interact with and be integrated to each of the SOA governance components that are already in the configuration. Accordingly, integration of the new product tends to become exponentially complicated.

Moreover, in addition to adding a new SOA governance product or component, the service of a component that is already included in the configuration can be changed to a different service state or version. A change of this type can also be an event that affects or impacts other components of the SOA governance configuration. Accordingly, managing service events across the SOA governance components can be extremely complicated.

SUMMARY

To enhance the integration of components in a configuration of SOA governance components, embodiments of the invention provide a mechanism for generating, monitoring and managing events generated by respective components through event producing plug-ins, and for ensuring that all components are notified of every event. Embodiments also furnish run-time information on service events, service versions and other metadata. One embodiment, associated with a configuration comprising multiple integrated SOA governance components, is directed to a method. Such embodiment comprises the steps of detecting a particular event that occurs at a particular SOA governance component of the configuration, and routing information pertaining to the detected event to a pre-specified storage location. The method further comprises operating a monitoring mechanism to selectively monitor the information routed to the location, and to determine from the monitored information that the particular event has occurred at the particular component of the configuration. Responsive to determining that the particular event has occurred at the particular component, the monitoring mechanism is further operated to query each of the remaining SOA governance components, in order to identify each of the remaining components in which the particular event does not exist.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable data storage medium(s) having computer readable program code embodied thereon.

Any combination of one or more computer readable data storage medium(s) may be utilized. The computer readable data storage medium may be, for example, but not limited to, an electronic, magnetic, optical, or semiconductor system, apparatus, or device, or any suitable combination of the foregoing. More specific examples (a non-exhaustive list) of the computer readable data storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable data storage medium may be any tangible medium that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
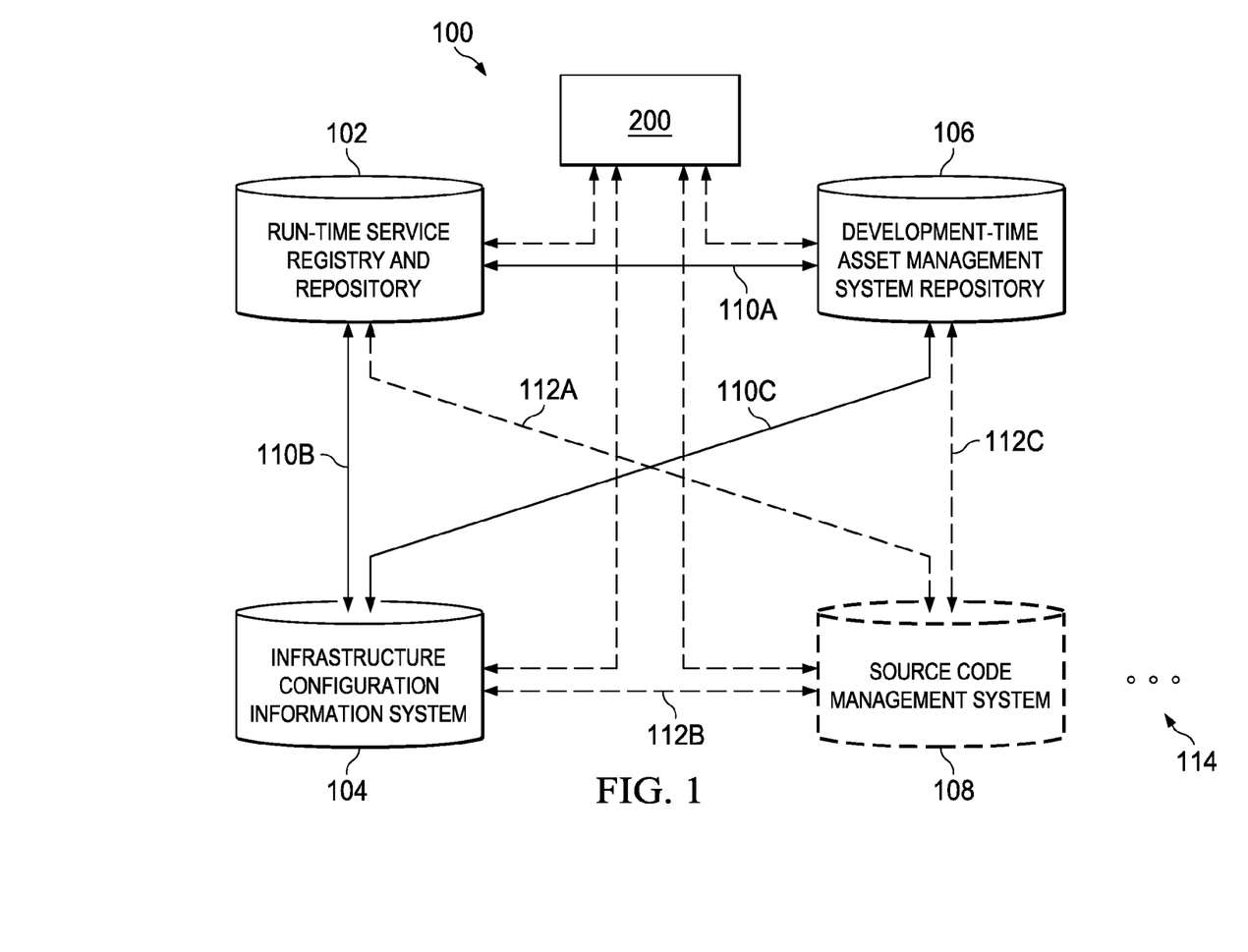
FIG. 1 is a block diagram depicting an embodiment of the invention in operative relationship with a configuration of SOA governance components.

Referring to FIG. 1, there is shown a configuration 100 of SOA governance components or products 102-106. These components are integrated and interconnected to act together, in order to manage or control the operation of an associated SOA (not shown). Each of the components 102-106 has a repository, wherein component 102 comprises a run-time service registry and repository. Component 104 comprises an infrastructure configuration information system, which keeps track of configuration items and other data elements pertaining thereto, and component 106 is a development time asset management system repository. FIG. 1 shows the SOA governance components 102-106 integrated together by means of respective links 110A-C. Moreover, FIG. 1 shows a system event generator or mechanism 200, described hereinafter in further detail in FIG. 2, which comprises an embodiment of the invention. Mechanism 200 is linked to each of the components 102-108, by means of a bidirectional communication path, in operative relationship.

FIG. 1 further illustrates, as an example, an event that affects each component 102-106. More specifically, the event arises from an intent to add another SOA governance component, comprising a source code management system 108, to configuration 100. This requires point-to-point (P2P) integration between component 108 and each of the components 102-106. Accordingly, a P2P connection must be established between component 108 and each of the other components, as illustrated by the links 112A-C, respectively. Integration of component 108 into configuration 100 also requires that each of the components 102-108 must be made to understand the meta-model of every other component. The meta-model of an SOA governance component identifies service events, service identifiers, service versions and other service metadata pertaining to the component. Moreover, each component of configuration 100 must be able to generate events and notifications for routing to other components, and must be adapted to respond to events and notifications received from other components.

Item 114 of FIG. 1 emphasizes that one or more additional SOA governance components can be added to and integrated with each of the other components of configuration 100.

Figure 2:
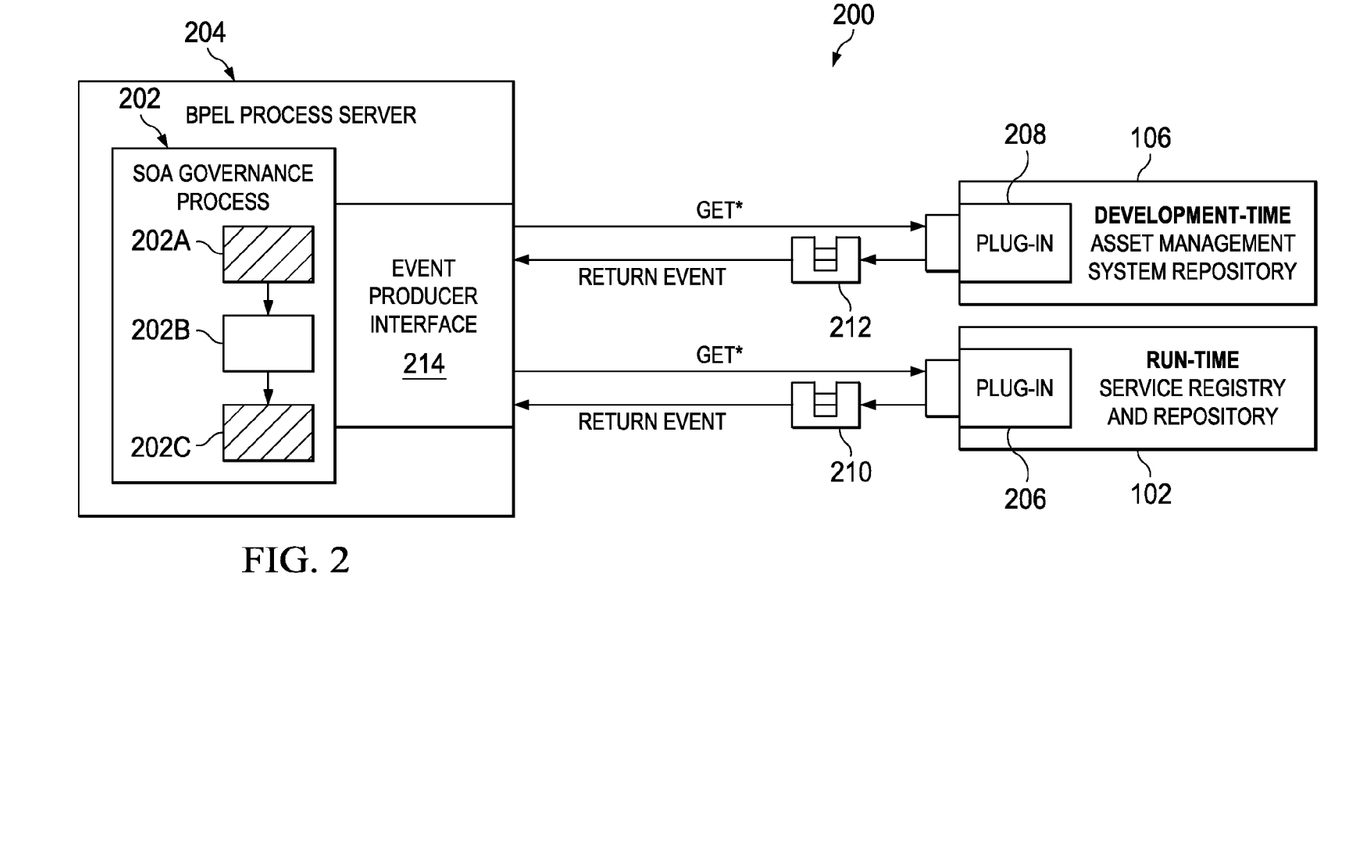
FIG. 2 is a block diagram showing respective components for implementing an embodiment of the invention.

Referring to FIG. 2, there is shown an embodiment of the invention comprising a system event generator or a mechanism 200, for generating, monitoring and managing events, such as events that are generated or produced by components 102 and 106 of SOA governance configuration 100. As described hereinafter in further detail, mechanism 200 defines one or more common meta-models to manage events generated by SOA governance products or components. Mechanism 200 also pulls event messages from each component, checks other components and triggers appropriate SOA governance processes. By performing these tasks or functions, mechanism 200 provides useful support or assistance in adapting respective components of configuration 100 to various events, such as the addition of the new component 108 as described in connection with FIG. 1. Mechanism 200 can also assist in integrating the new component into configuration 100.

As used herein, the terms SOA governance product, governance process, and governance flow are equivalent and may be used interchangeably. Each of these terms is defined to be a stream, sequence or other specified arrangement of tasks or processes, wherein the tasks or processes are used collectively to provide direction for or to exercise control over the services of an SOA. FIG. 2 shows an SOA governance process 202, in accordance with an embodiment of the invention, residing in a Business Process Execution Language (BPEL) process server 204. Process 202 depicts a number of tasks and their flow or arrangement, for an associated SOA governance product or procedure (not shown). Process 202 is usefully provided by a single Java Virtual Machine (not shown) and comprises software components 202A-C.

Components 202A and 202C generically represent tasks or service operations that are initially specified by the SOA governance product vendor and are intended to be implemented by the vendor only. In contrast, component 202B generically represents tasks or operations that can be modified by the user.

Referring further to FIG. 2, there is shown the repositories of SOA components 102 and 106 installed with plug-ins 206 and 208, respectively. Plug-in 206 has an associated JMS storage queue 210, and plug-in 208 has an associated JMS storage queue 212. While not shown, SOA components 104 and 108 of configuration 100 each has a similar plug-in and JMS queue.

Each plug-in for an SOA component is disposed to listen to events generated by its component, such as adding a new service or changing the service. The plug-in will also put each event it detects into the JMS queue for its component. Moreover, each plug-in will respond to requests to its component, or component repository, to provide specified information, wherein respective requests are sent by SOA governance process 202. Such requests, or get*methods, can include requests for information such as application information, service state and service lists.

FIG. 2 further shows process server 204 provided with an event producer interface 214. Interface 214 enables information requests, responses and other messages to be exchanged between the SOA governance process 202 and the plug-ins and queues of respective SOA component repositories. Event producer interface 214 is generic, so that other SOA component repositories and metadata information can be added later, without impacting the interface or the architecture of mechanism 200. Usefully, interface 214 can communicate using both XSDs and Web Services Description Language (WSDL).

Mechanism 200 of FIG. 2, which is provided for monitoring, managing and generating events, is capable of performing the services of registering and also unregistering events. These services are very important to the overall objective described above, of integrating an SOA component into a configuration of other SOA components. To register an event, such as a service state change, an initial process calls once per SOA component to register for events at install/deploy time. Events for all service changes will be put into a JMS queue, as specified in associated parameters. In order to unregister an event, mechanism 200 gets called if the SOA component is no longer going to be participating in the SOA configuration. In this case the SOA component does not need to put messages in a JMS queue.

Mechanism 200 can also perform other services, such as determining whether a service (and/or any of its versions) exists in an SOA component; informing an SOA component that a state for a service has changed; and determining whether service metadata values exist, and also if they have been changed. Examples of metadata values are attribute name, name space, old value and present value.

In embodiments of the invention, it has been recognized that in order to achieve the objective of integrating SOA components into a configuration, and to perform services of the types described above, an extensive and orderly flow of information must take place between the SOA governance process 202 of mechanism 200, and each of the SOA components such as components 102 and 106. In order to achieve this, SOA governance process 202 is used to construct a set comprising multiple SOA governance procedures, wherein each procedure corresponds to a different event that can occur in regard to one or more of the SOA components of a configuration such as configuration 100. When a particular event is detected, mechanism 200 is operated in accordance with the corresponding procedure.

Figure 3:
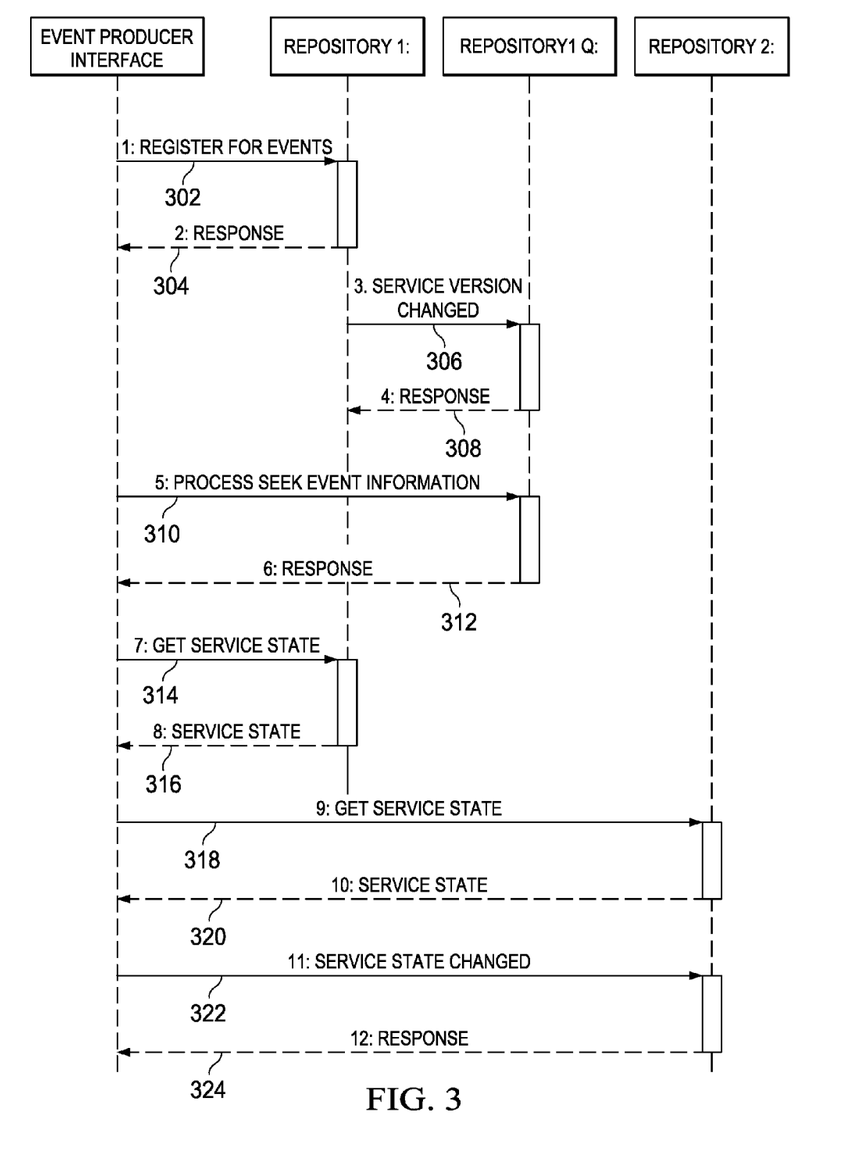
FIG. 3 depicts a sequence diagram associated with the embodiment of FIG. 2.

Referring to FIG. 3, there is shown a sequence diagram which illustrates an exemplary procedure of the type discussed above. More particularly, FIG. 3 illustrates respective steps or tasks 1.-12. of a procedure carried out between event producer interface 214 and the repositories of different components of an SOA governance configuration, when a particular event has occurred. The particular event for FIG. 3 is a change of the service version used at one of the SOA governance components. In FIG. 3, the repository of such component is referred to as Repository 1, the JMS queue of the component is referred to as Repository 1Q, and the repository of a different component of the configuration is referred to as Repository 2.

Assuming the event producing plug-in has been installed on Repository 1, as an initial step in the procedure shown by FIG. 3, the event producer interface 214 sends a RegisterForEvents message 302 to Repository 1. This message initiates an initial set up procedure at Repository 1. Repository 1 then completes the initial set up by sending a prespecified response message 304 back to interface 214.

Following message 304 and the completion of set up, the component of Repository 1 recognizes that the version of a service it is using has been changed. Accordingly, the Repository 1 sends a message 306 to its JMS queue (Repository 1Q) which provides notice of the service version change. The JMS queue then returns a response 308 to Repository 1, in order to acknowledge the notice.

In accordance with the procedure referred to above, event producer interface 214 periodically queries the JMS queue of each component repository, in order to determine whether any of them contains new or updated information pertaining to an event. Referring further to FIG. 3, there is shown interface 214 sending a query 310 of this type to the queue of Repository 1. As a response 312, the queue sends the previous message 306 to interface 214. Thus, the event producer interface 214 and governance process 202 of mechanism 200 are notified of the service version change at the SOA component of Repository 1.

In response to notification of this event, the mechanism 200 first directs interface 214 to confirm the current state of Repository 1, by sending a GetServiceState message 314 thereto. In response, Repository 1 returns a Service State message 316 that provides the current Service State value.

Thereafter, interface 214 is operated to sequentially contact each of the other SOA components of the configuration, to get current Service State value in each of the other components. Herein, an event is said to exist in an SOA component or repository thereof, if the component is aware of or has been notified of the event, and has been changed or adapted in view of the event. In FIG. 3, this process is illustrated at step 9, wherein a GetServiceState message 318 is sent from interface 214 to Repository 2, the repository of a different SOA component. In response, Repository 2 returns a ServiceState message 320. From this message, event producer interface 214 is able to determine that the SOA component of Repository 2 has not been changed or adapted in correspondence with the service version change event. Accordingly, interface 214 sends a message 322 to Repository 2, to inform its component of the event. The component then implements any changes or modifications needed for its own service or for its relationship with other components of the configuration. After doing this, the event will exist in Repository 2. Repository 2 notifies the event producer interface of this implementation by means of a message 324.

Subsequently, steps 7.-12. of FIG. 3 are carried out with respect to each of the remaining components of the SOA configuration. Thus, mechanism 200 will systematically adapt each component to an event such as a service version change at one of the components.

In a useful embodiment of the invention, SOA governance process 202 could be used to configure or construct an SOA governance template for each of the procedures of the set referred to above. The templates would be retained in a library, and a particular template would be accessed in response to the occurrence of an event corresponding thereto, in order to implement the corresponding procedure.

Figure 4:
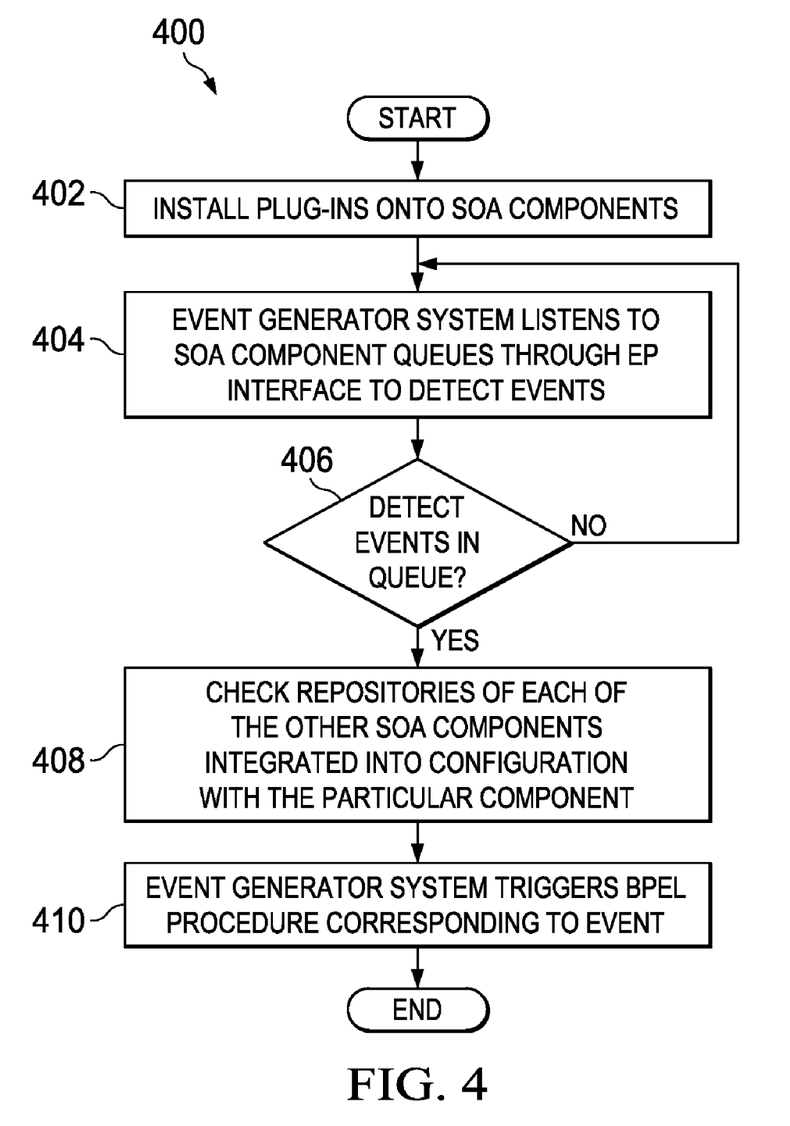
FIG. 4 is a flow chart showing steps for a method comprising an embodiment of the invention.

Referring to FIG. 4, there are shown steps for a method 400 in accordance with a generalized embodiment of the invention. Initially, at step 402 a plug-in is installed onto each SOA component of an SOA configuration, together with its associated JMS storage queue. Examples of this activity are shown in FIG. 2 by plug-in 206 and its queue 210 installed on the repository of component 102, and by plug-in 208 and its queue 212 installed on the repository of component 106. The mechanism or event generator system 200 is formed, when each component in the SOA configuration has been provided with a plug-in and queue, and each plug-in and queue is linked to an event producer interface 214 or the like. Step 404 indicates that system 200 listens to respective component queues, through the event producer interface, to detect events such as those described in connection with FIG. 3 as well as other types of events. At decision step 406, an event may be detected at the queue of a particular component. If so, the repositories of each of the other components of configuration 100 are checked, as shown at step 408, to determine which of them, if any, shows the detected event. At step 410 the SOA governance process of system 200 triggers a BPEL procedure that corresponds to the detected event, and the method is ended.

Figure 5:
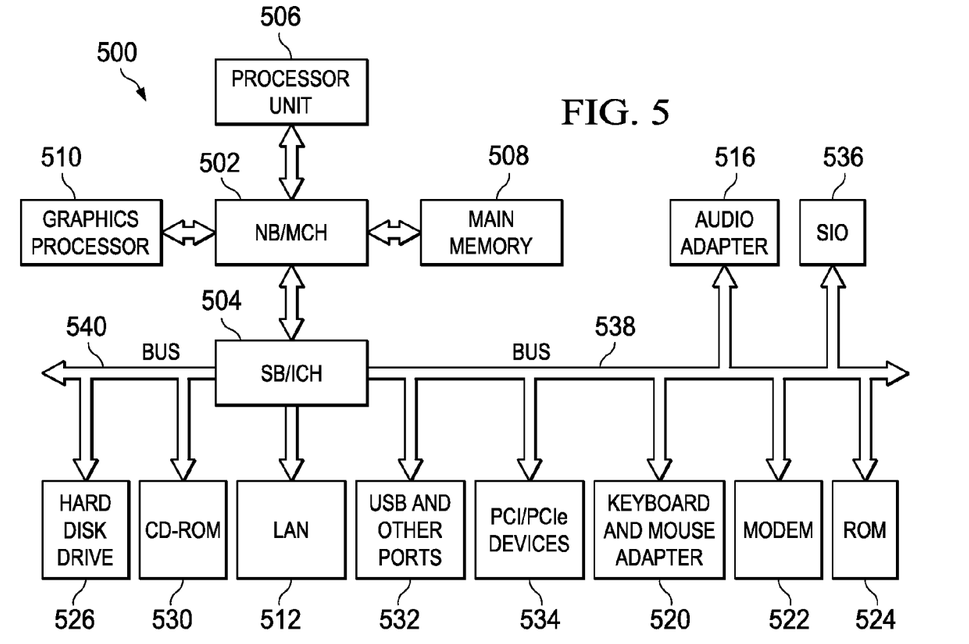
FIG. 5 is a block diagram showing a computer or data processing system that may be used in implementing embodiments of the invention.

Referring to FIG. 5, there is shown a data processing system 500 that may be used in implementing embodiments of the invention. Data processing system 500 is an example of a computer which may be used for server 204 of FIG. 2, and in which computer usable code or instructions implementing the processes for embodiments of the present invention may be located. One or more data processing system 500 may also be used in implementing respective SOA components of configuration 100.

Data processing system 500 employs a hub architecture including north bridge and memory controller hub (MCH) 502 and south bridge and input/output (I/O) controller hub (ICH) 504. Processing unit 506, main memory 508, and graphics processor 510 are connected to north bridge and memory controller hub 502. Graphics processor 510 may be connected to north bridge and memory controller hub 502 through an accelerated graphics port (AGP).

In data processing system 500, local area network (LAN) adapter 512 connects to south bridge and I/O controller hub 504. Audio adapter 516, keyboard and mouse adapter 520, modem 522, read only memory (ROM) 524, hard disk drive (HDD) 526, CD-ROM drive 530, universal serial bus (USB) ports and other communications ports 532, and PCI/PCIe devices 534 connect to south bridge and I/O controller hub 504 through bus 538 and bus 540. PCI/PCIe devices may include, for example, Ethernet adapters, add-in cards and PC cards for notebook computers. PCI uses a card bus controller, while PCIe does not. ROM 524 may be, for example, a flash binary input/output system (BIOS).

Hard disk drive 526 and CD-ROM drive 530 connect to south bridge and I/O controller hub 504 through bus 540. Hard disk drive 526 and CD-ROM drive 530 may use, for example, an integrated drive electronics (IDE) or serial advanced technology attachment (SATA) interface. Super I/O (SIO) device 236 may be connected to south bridge and I/O controller hub 504.

An operating system runs on processing unit 506 and coordinates and provides control of various components within data processing system 500 in FIG. 5. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 500 (Java is a trademark of Sun Microsystems, Inc. in the United States, other countries, or both).

As a server, data processing system 500 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as hard disk drive 526, and may be loaded into main memory 508 for execution by processing unit 506. The processes for embodiments of the present invention are performed by processing unit 506 using computer usable program code, which may be located in a memory such as, for example, main memory 508, read only memory 524, or in one or more peripheral devices 526 and 530.

A bus system may be comprised of one or more buses, such as bus 538 or bus 540 as shown in FIG. 5. Of course the bus system may be implemented using any type of communications fabric or architecture that provides for a transfer of data between different components or devices attached to the fabric or architecture. A communications unit may include one or more devices used to transmit and receive data, such as modem 522 or network adapter 512 of FIG. 5. A memory may be, for example, main memory 508, read only memory 524, or a cache such as found in north bridge and memory controller hub 502 in FIG. 5.

Figure 6:
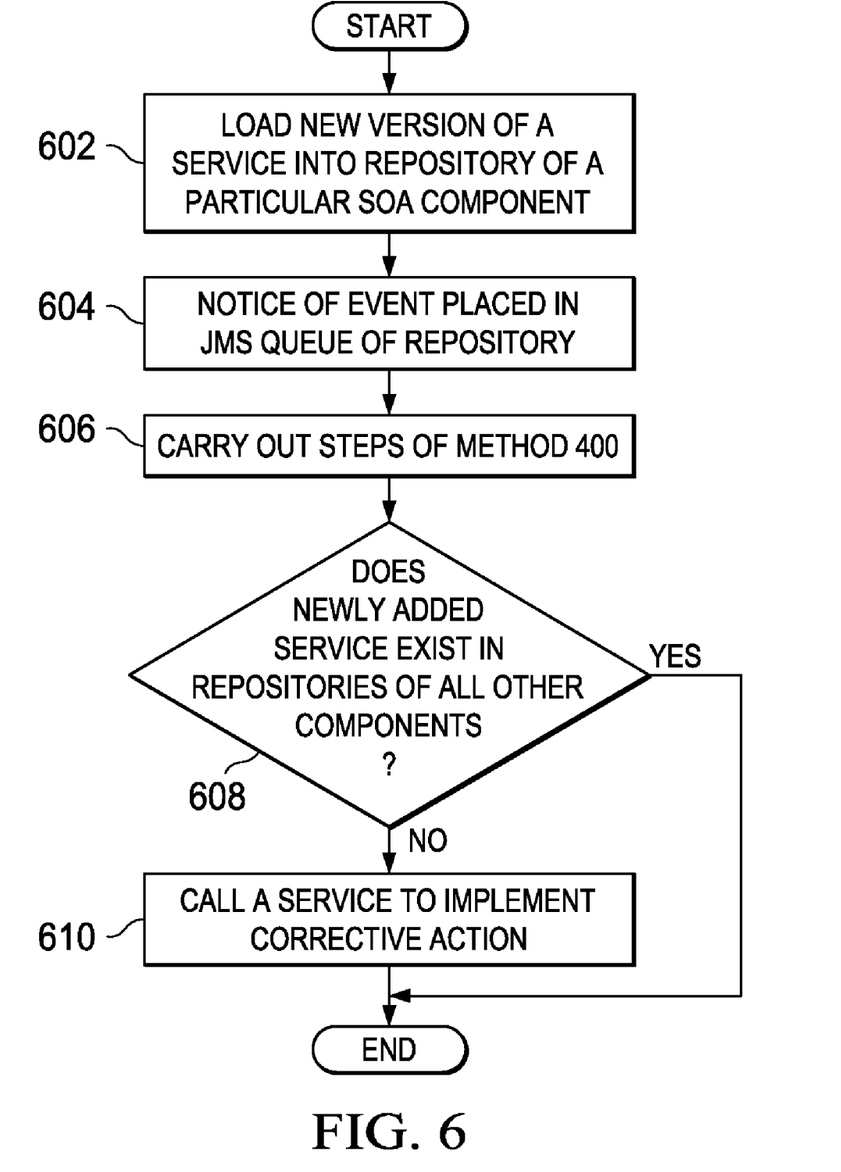
FIG. 6 is a flow chart showing steps for another method comprising an embodiment of the invention.

Referring to FIG. 6, there are shown steps for a method comprising a further embodiment of the invention, which incorporates respective steps of method 400 shown in connection with FIG. 4. More particularly, as a representative example the method of FIG. 6 pertains to an event comprising the loading of a new version of a particular service, into the repository of a particular component of SOA governance configuration 100. This task is shown in FIG. 6 at step 602. At step 604, notice of the event is placed into the repository of the particular component.

Referring further to FIG. 6, there is shown step 606, which comprises performing or carrying out respective steps of method 400, described above. In accordance with step 408 of such method, the repositories of respective components are checked, in order to determine whether or not the newly added service exists in each of them. Thus, if the newly added service is found not to exist in all of the repositories, a service is called at step 610 to implement corrective action. Examples of such action could include sending an email to a repository administrator, or creating a human task for administration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing events in with a configuration comprising multiple integrated service oriented architecture (SOA) governance components, said method comprising the steps of:

a computer detecting a particular event that occurs at a particular SOA governance component of said configuration;

the computer routing information pertaining to said detected event to a pre-specified storage location;

the computer operating a monitoring mechanism to selectively monitor said information routed to said pre-specified storage location, and to determine from said monitored information that said particular event has occurred at said particular component of said configuration;

the computer, responsive to determining that said particular event has occurred at said particular component, further operating said monitoring mechanism to query each remaining SOA governance component of said configuration, in order to identify each of said remaining SOA governance components in which said particular event does not exist; and the computer, responsive to determining that said particular event, representing a service state change, does not exist on at least one of said remaining SOA governance components, implementing an action selected from a group of actions, wherein said group includes at least actions of sending an email to a repository administrator, and creating a human task for administration.

2. The method of claim 1, further comprising the step of:
the computer operating said monitoring mechanism to determine whether said particular event exists in a given one of said remaining SOA governance components by first determining whether said given remaining SOA governance component has been notified of said particular event, and if so determining whether said given remaining SOA governance component has been changed as a result of said particular event.

3. The method of claim 1, wherein:
each SOA governance component of said configuration has an associated plug-in and an associated storage queue.

4. The method of claim 3, wherein:
responsive to the occurrence of an event at a given SOA governance component of said configuration, the given SOA governance component routes a message using the computer, the message providing notice of the event to the associated storage queue of the given SOA governance component.

5. The method of claim 3, wherein:
said monitoring mechanism includes an interface for communicating with each SOA governance component of said configuration through the associated plug-in and the associated storage queue of a respective SOA governance component of said configuration.

6. The method of claim 3, further comprising the step of:
the computer operating said monitoring mechanism to sequentially query the associated storage queue of each SOA governance component of said configuration, to detect messages contained therein that provide notice of the occurrences of events at the respective SOA governance components.

7. The method of claim 1, wherein:
operation of said monitoring mechanism by the computer is directed by a specified SOA governance procedure.

8. The method of claim 7, wherein:
said specified SOA governance procedure corresponds to said particular event, and is selected from a set comprising multiple SOA governance procedures in which each SOA governance procedure corresponds to a different event.

9. The method of claim 1, wherein:
said particular event is selected from a group of events that includes at least a service state change, and addition of a new SOA governance component to said configuration.

10. A computer program product for managing events in a configuration comprising multiple integrated service oriented architecture (SOA) governance components, the computer program product comprising:
one or more computer readable tangible storage devices;
program instructions, stored on at least one of the one or more computer readable tangible storage devices, to detect a particular event that occurs at a particular SOA governance component of said configuration;
program instructions, stored on at least one of the one or more computer readable tangible storage devices, to route information pertaining to said detected event to a pre-specified storage location;
program instructions, stored on at least one of the one or more computer readable tangible storage devices, to operate a monitoring mechanism to selectively monitor said information routed to said pre-specified storage location, and to determine from said monitored information that said particular event has occurred at said particular component of said configuration;
program instructions, stored on at least one of the one or more computer readable tangible storage devices, responsive to determining that said particular event has occurred at said particular component, to further operate said monitoring mechanism to query each remaining SOA governance component of said configuration, in order to identify each of said remaining SOA governance components in which said particular event does not exist; and
program instructions, stored on at least one of the one or more computer readable tangible storage devices, responsive to determining that said particular event, representing a service state change, does not exist on at least one of said remaining SOA governance components, to implement an action selected from a group of actions, wherein said group includes at least actions of sending an email to a repository administrator, and creating a human task for administration.

11. The computer program product of claim 10, further comprising:
program instructions, stored on at least one of the one or more computer readable tangible storage devices, to operate said monitoring mechanism to determine whether said particular event exists in a given one of said remaining SOA governance components by first determining whether said given remaining SOA governance component has been notified of said particular event, and if so determining whether said given remaining SOA governance component has been changed as a result of said particular event.

12. The computer program product of claim 10, wherein:
each SOA governance component of said configuration has an associated plug-in and an associated storage queue, and wherein the computer program product further comprises program instructions, stored on at least one of the one or more computer readable tangible storage devices, responsive to the occurrence of an event at a given SOA governance component of said configuration, to route a message from the given SOA governance component, the message providing notice of the event to the associated storage queue of the given SOA governance component.

13. The computer program product of claim 12, further comprising:
program instructions, stored on at least one of the one or more computer readable tangible storage devices, to operate said monitoring mechanism to sequentially query the associated storage queue of each SOA governance component of said configuration, to detect messages contained therein that provide notice of the occurrences of events at the respective SOA governance components.

14. The computer program product of claim 10, wherein:
operation of said monitoring mechanism is directed by a specified SOA governance procedure that corresponds to said particular event, and is selected from a set comprising multiple SOA governance procedures in which each SOA governance procedure corresponds to a different event.

15. An apparatus for managing events in a configuration comprising multiple integrated service oriented architecture (SOA) governance components, the apparatus comprising:
one or more processors, one or more computer readable memories and one or more computer readable tangible storage devices;
program instructions, stored on at least one of the one or more computer readable tangible storage devices for execution by at least one of the one or more processors via at least one of the one or more computer readable memories, to detect a particular event that occurs at a particular SOA governance component of said configuration;
program instructions, stored on at least one of the one or more computer readable tangible storage devices for execution by at least one of the one or more processors via at least one of the one or more computer readable memories, to route information pertaining to said detected event to a pre-specified storage location;
program instructions, stored on at least one of the one or more computer readable tangible storage devices for execution by at least one of the one or more processors via at least one of the one or more computer readable memories, to operate a monitoring mechanism to selectively monitor said information routed to said pre-specified storage location, and to determine from said monitored information that said particular event has occurred at said particular component of said configuration;
program instructions, stored on at least one of the one or more computer readable tangible storage devices for execution by at least one of the one or more processors via at least one of the one or more computer readable memories, responsive to determining that said particular event has occurred at said particular component, to further operate said monitoring mechanism to query each remaining SOA governance component of said configuration, in order to identify each of said remaining SOA governance components in which said particular event does not exist; and
program instructions, stored on at least one of the one or more computer readable tangible storage devices for execution by at least one of the one or more processors via at least one of the one or more computer readable memories, responsive to determining that said particular event, representing a service state change, does not exist on at least one of said remaining SOA governance components, to implement an action selected from a group of actions, wherein said group includes at least actions of sending an email to a repository administrator, and creating a human task for administration.

16. The apparatus of claim 15, further comprising:
program instructions, stored on at least one of the one or more computer readable tangible storage devices for execution by at least one of the one or more processors via at least one of the one or more computer readable memories, to operate said monitoring mechanism to determine whether said particular event exists in a given one of said remaining SOA governance components by first determining whether said given remaining SOA governance component has been notified of said particular event, and if so determining whether said given remaining SOA governance component has been changed as a result of said particular event.

17. The apparatus of claim 15, wherein:
each SOA governance component of said configuration has an associated plug-in and an associated storage queue, and wherein the apparatus further comprises program instructions, stored on at least one of the one or more computer readable tangible storage devices for execution by at least one of the one or more processors via at least one of the one or more computer readable memories, responsive to the occurrence of an event at a given SOA governance component of said configuration, to operate the given SOA governance component to route a message providing notice of the event to the associated storage queue of the given SOA governance component.

18. The apparatus of claim 17, further comprising:
program instructions, stored on at least one of the one or more computer readable tangible storage devices for execution by at least one of the one or more processors via at least one of the one or more computer readable memories, to operate said monitoring mechanism to sequentially query the associated storage queue of each SOA governance component of said configuration, to detect messages contained therein that provide notice of the occurrences of events at respective SOA governance components of said configuration.

19. The apparatus of claim 15, wherein:
operation of said monitoring mechanism is directed by a specified SOA governance procedure.

\* \* \* \* \*